United States Patent [19]
Kopp et al.

[11] Patent Number: 5,321,412
[45] Date of Patent: Jun. 14, 1994

[54] ANTENNA ARRANGEMENT WITH REDUCED COUPLING BETWEEN TRANSMIT ANTENNA AND RECEIVE ANTENNA

[75] Inventors: Markus B. Kopp, Pompano Beach; Richard L. Copeland, Boca Raton, both of Fla.

[73] Assignee: Sensormatic Electronics Corporation, Deerfield Beach, Fla.

[21] Appl. No.: 8,417

[22] Filed: Jan. 25, 1993

Related U.S. Application Data

[63] Continuation of Ser. No. 699,206, May 13, 1991, abandoned.

[51] Int. Cl.⁵ .................... H01Q 7/00; G08B 13/24
[52] U.S. Cl. .................... 343/742; 340/572; 343/867
[58] Field of Search ............... 340/551, 572; 343/742, 343/867, 725, 728; H01Q 21/24, 21/22, 7/00, 7/04, 21/30, 21/06

[56] References Cited

U.S. PATENT DOCUMENTS

| | | | |
|---|---|---|---|
| 2,093,158 | 9/1937 | Pratt | 343/867 |
| 2,432,858 | 12/1947 | Brown | 343/725 |
| 4,135,183 | 1/1979 | Heltemes | 340/572 |
| 4,393,350 | 7/1983 | Hansen et al. | 324/334 |
| 4,510,489 | 4/1985 | Anderson, III et al. | 340/572 |
| 4,510,490 | 4/1985 | Anderson, III et al. | 340/572 |
| 4,633,250 | 12/1986 | Anderson, III et al. | 340/572 |
| 5,051,726 | 9/1991 | Copeland et al. | 340/572 |

FOREIGN PATENT DOCUMENTS 1307648  2/1973  United Kingdom .............. 343/742

Primary Examiner—Rolf Hille
Assistant Examiner—Peter Toby Brown
Attorney, Agent, or Firm—Robin, Blecker, Daley & Driscoll

[57] ABSTRACT

An antenna arrangement in which a first antenna means is arranged to define a null contour adjacent the first antenna means and at which the magnetic flux from the first antenna means is substantially a null and in which a second antenna means is arranged to substantially follow the null contour.

25 Claims, 4 Drawing Sheets

ANTENNA ARRANGEMENT WITH REDUCED COUPLING BETWEEN TRANSMIT ANTENNA AND RECEIVE ANTENNA

This is a continuation application under 37 CFR 1.62 of prior application Ser. No. 699,206, filed May 13, 1991 and now abandoned.

FIELD OF THE INVENTION

This invention relates to antenna arrangements and in particular to antenna arrangements for use in various systems including electronic article surveillance (EAS) systems.

BACKGROUND OF THE INVENTION

In antenna arrangements having both transmitting and receiving antennas, energy from the fundamental field formed by the transmitting antenna is often coupled into the receiving antenna. As can be appreciated, such coupling of energy reduces the effectiveness of the receiving antenna.

U.S. Pat. No. 4,135,183 describes an antenna arrangement which attempts to minimize this undesired coupling. More particularly, in the antenna arrangement of the '183 patent, a "figure-8" shaped transmitting antenna is provided wherein the top and bottom coils or loops are of opposite phase. The receiving antenna is also shaped as a "figure-8" with its axis perpendicular to the axis of the transmitting antenna.

Due to the opposite phasing of the loops of the transmitting antenna and the orientation of the receiving antenna with respect thereto, the effective coupling between the receiving antenna and the field produced by the transmitting antenna is substantially zero. Therefore, the pickup at the receiving antenna of the fundamental field produced by the transmitting antenna is minimized.

The above-described "figure-8" antenna arrangement, while minimizing coupling between the transmitting and receiving antennas, also produces unwanted nulls in both the transmitted field and the receiving pattern. A further undesirable effect of the "figure-8" antenna arrangement is that the energy coupled into the receiving antenna induces a current within the antenna which results in a field which opposes and diminishes the magnetic field produced by the transmitting antenna. This disrupts operation of the transmitting antenna and, further, is wasteful of energy.

In the '183 patent, the "figure-8" antenna arrangement is used in a harmonic-type magnetic EAS system. In such a system, electromagnetic energy is continuously transmitted at a fundamental frequency into a predetermined surveillance zone. In response to the transmitted electromagnetic energy, an EAS tag, when positioned within the surveillance zone, generates a signal at a harmonic of the fundamental frequency. This signal is detected by the receiving antenna and appropriate action is initiated, e.g., sounding an alarm.

However, due to the above-discussed nulls created by the "figure-8" configuration in the transmitted field, EAS tags positioned at these nulls do not generate signals and, hence, are not detected. Furthermore, as also above noted, a current is induced within the receiving antenna which induces fields which reduce the fundamental field and waste energy.

In another type of EAS system, known as a magnetomechanical type of EAS system, which is described in U.S. Pat. Nos. 4,510,489 and 4,510,490 and U.S. Pat. No. 5,051,726, the effects of coupling between the transmitting and receiving antennas of the system are minimized by a timing arrangement. In this system, the fundamental field generated by the transmitting antenna is pulsed on for a period of time and then is turned off. After waiting for the transmitted energy coupled into the receiving antenna to dissipate, the receiving antenna is enabled. Since the coupled energy has dissipated, the receiving antenna can now detect signals generated by tags without interference.

In the above system, the need to wait before turning on the system receiving antenna is undesirable. More particularly, the signal generated by a tag is at a maximum when the transmitted field is initially turned off and then decays at an exponential rate. Accordingly, due to the delay in enabling the receiving antenna, the receiving antenna must be capable of detecting tag signals which are at a reduced level. This increases the sensitivity demands placed on the receiving system and/or limits the extent of the surveillance zone.

Furthermore, in magnetomechanical type EAS systems, for example, it is known to use two spaced transmitting antennas arranged in parallel planes defined by the vertical and lateral directions to radiate two different fundamental fields (fields due to two different antennas) along the antenna axes (i.e., in the horizontal direction) into the surveillance zone. These fields, moreover, are radiated such that they are 180° out-of-phase. As a result, the fields subtract along the horizontal direction and add along the vertical and lateral directions. Accordingly, with the fields so generated, tags orientated vertically and laterally in the surveillance zone, result in additive voltages in serially connected, oppositely phased receiving antennas. Detection of vertically and laterally oriented tags is thereby enhanced.

It is also known in such systems to use the transmitting antennas to radiate two different fields from two different antennas such that the fields are in-phase. In this case, tags orientated horizontally in the surveillance zone result in additive voltages in in-phase, serially connected receiving antennas, thereby enhancing the detection of the horizontally oriented tags. Thus, by switching the phasing operation of the two transmitting antennas and the two receiving antennas, detection of tags oriented in the vertical, lateral and horizontal directions is facilitated.

Due to the delay required before enabling the receiving antennas in the aforesaid systems, the phasing of the two transmitting antennas cannot be rapidly changed. This slows down the overall system operation.

It is therefore an object of the present invention to provide an improved antenna arrangement in which the coupling between the transmitting and receiving antennas of the arrangement is reduced in a way which avoids the above problems of prior systems.

It is a further object of the present invention to provide an EAS system which uses the above improved antenna arrangement.

It is a still further object of the present invention to provide an EAS system using the above described improved antenna arrangement in which the phase of the transmitted fields can be rapidly switched.

SUMMARY OF THE INVENTION

In accordance with the principles of the present invention, the above and other objectives are realized in an antenna arrangement in which a transmitting antenna means is arranged to define a path or contour adjacent to the antenna means and along which the magnetic flux from the transmitting antenna means is substantially a null and away from which the magnetic flux from the transmitting antenna means is other than substantially a null. A receiving antenna means is further arranged such that it substantially follows the null contour defined by the transmitting antenna means. In this way, coupling of the transmitted field to the receiving antenna means is substantially eliminated.

In the embodiment of the invention to be disclosed hereinafter, the transmitting antenna means comprises first and second antennas which together are arranged to define the null contour when excited. The receiving antenna means, in turn, comprises a third antenna arranged substantially to follow the aforesaid null contour.

Also described is an EAS system using the antenna arrangement. In the disclosed system two antenna arrangements are used and these antenna arrangements are positioned on opposing sides of a surveillance zone. The antenna arrangements are further excited in a switchable manner between first and second modes.

In the first mode, the first and second antenna arrangements are excited such that the fields established in the surveillance zone along the antenna axis are in-phase. In the second mode, the antenna arrangements are excited such that these fields are out-of-phase. In this way, EAS tags oriented vertically, horizontally and laterally in the zone can be readily detected by receiving antenna arrangements connected to have the same phasing as the transmitting antenna arrangements.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
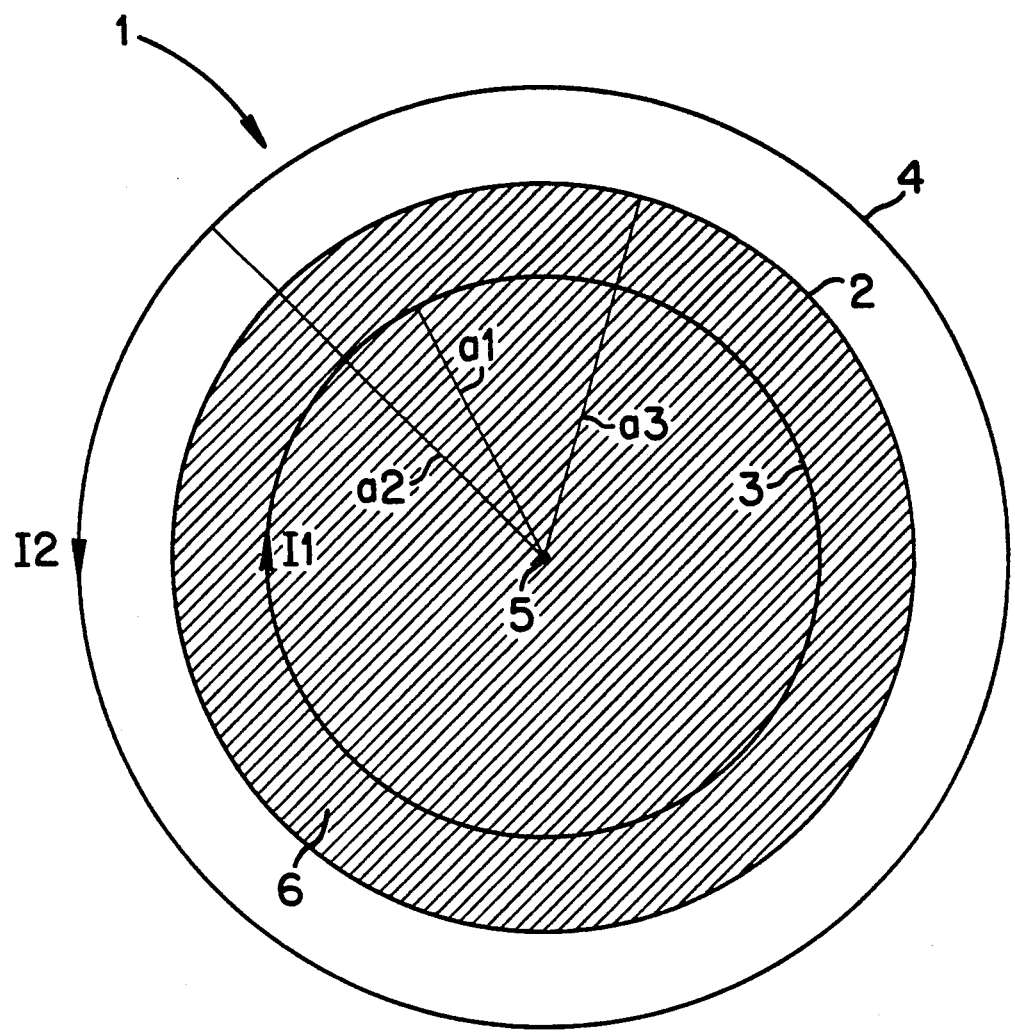
FIG. 1 illustrates an antenna arrangement in accordance with the principles of the present invention.

FIG. 1 shows an antenna arrangement 1 in accordance with the principles of the present invention. As illustrated the antenna arrangement 1 comprises a receiving antenna 2 and a transmitting antenna assembly formed from an inner transmitting antenna 3 and an outer transmitting antenna 4.

The receiving antenna 2, in the present case, comprises N individual coils or turns of wire or other types of conductive material. For such a receiving antenna, the voltage V induced across the antenna is equal to the negative of the product of the number of turns of the antenna and the change with time of the magnetic flux being applied to the antenna. Thus, V can be expressed as follows:

$$V = -N \frac{d\Phi}{dt} \tag{1}$$

where, N is the number of coil turns, and
$\Phi$ is the magnetic flux.

As can be appreciated from equation (1), the voltage induced (coupled) across the receiving antenna 2 by the transmitting antenna assembly is a function of the total magnetic flux $\Phi$ produced by the the inner and outer transmitting antennas 3 and 4. In accordance with the principles of the present invention, the inner and outer transmitting antennas 3 and 4 are arranged and excited such that this total magnetic flux is substantially a null or zero along a contour or path substantially followed by the receiving antenna 2. As a result, the voltage induced (coupled) in the receiving antenna 2 by the transmitting antenna assembly will be substantially zero and the transmitting antenna assembly will therefore have a negligible interference effect on the receiving antenna.

In the present illustrative case, the inner and outer transmitting antennas 3 and 4 are shown as coplanar and circular. They, furthermore, are also shown as circumscribing a common point 5 and as having respective radii a1 and a2. With such a configuration, it can be shown that the two antennas, when excited with opposite phases, will result in a magnetic flux having a null contour which is also substantially circular and in the plane of the antenna. This null contour, furthermore, will be at a radius a3 between the radii a2 and a1. Accordingly, as shown, the receiving antenna 2 is situated in the plane of the antennas 3 and 4 and defines a circle of radius a3 so that it follows the null contour established by the transmitting antennas. The aforesaid null contour for the circular antennas 3 and 4 can be determined from the magnetic flux $\Phi$ for the antennas which, in turn, is a function of the magnetic flux density B in accordance with the following relationship:

$$\Phi = \int_s B \cdot n \, da \tag{2}$$

where,
B is the magnetic flux density,
n is a unit vector normal to the surface of integration, and
da is the infinitesimal area over which integration is performed on surface S For the case where the outer transmitting antenna 4 is excited by a current I2 which is 180° out-of-phase with the current I1 exciting the inner antenna 3, the equation for the total magnetic flux B in the plane of the loops is given as:

$$B(r, z = 0)_{total} = -3U_o I_1 \frac{a_1^2 r^2 (a_1^2 + r^2)}{(a_1 - r)^5 (a_1 + r)^5} a_z + \tag{3}$$

$$3U_o I_2 \frac{a_2^2 r^2 (a_2^2 + r^2)}{(a_2 - r)^5 (a_2 + r)^5} a_z$$

wherein,
a1, a2, = the radii of the inner and outer transmitting antennas, respectively,
I1, I2, = the products of current excitations and number of turns of the inner and outer transmitting antennas, respectively, the currents being 180 degrees out of phase,
$U_o$ = permeability of free space, r = distance from the center 5 in the plane of the loops, and $\hat{a}_z$ = unit vector along the z axis.

It should be noted that equation (3) assumes that the antennas 3 and 4 are low frequency magnetic loop antennas and have winding dimensions which are very small compared to the electromagnetic wavelength. This condition is easily met by each antenna having under 100 coil turns, characteristic dimensions of under about 5 meters and an excitation frequency of less than about 100 kHZ.

If equation (3) is now substituted into equation (2), we obtain an expression for the magnetic flux $\Phi$ in the plane of the transmitting antenna assembly given by:

$$\Phi = 6\pi U_o \int_0^r \left( \frac{-I_1 a_1^2 r^3 (a_1^2 + r^2)}{(a_1 - r)^5 (a_1 + r)^5} + \frac{I_2 a_2^2 r^3 (a_2^2 + r^2)}{(a_2 - r)^5 (a_2 + r)^5} \right) dr \quad (4)$$

Integrating equation (4) yields the total magnetic flux formed by the inner and outer transmitting antennas 3 and 4 within the plane of the antennas as a function of the radius r from the center 5. Thus, can be expressed as follows:

$$\Phi = -6\pi U_o \left( \frac{[r^4(X + Y)]}{4 (-a_1 + r)^4 (a_1 + r)^4 (-a_2 + r)^4 (a_2 + r)^4} \right) \quad (5)$$

Where $X = a_1^2 a_2^8 I_1 - a_1^8 a_2^2 I_2 - 4 a_1^2 a_2^6 I_1 r^2 + 4 a_1^6 a_2^2 I_2 r^2 + 6 a_1^2 a_2^4 I_1 r^4$ $Y = -6 a_1^4 a_2^2 I_2 r^4 - 4 a_1^2 a_2^2 I_1 r^6 + 4 a_1^2 a_2^2 I_2 r^6 + a_1^2 I_1 r^8 - a_2^2 I_2 r^8$ It can be shown that the equation (5) has a zero or null at a radius a3 between the radii a1 and a2 of the transmitting antennas 3 and 4. Thus, the null contour for the antenna assembly is a circle of radius a3. As indicated above, the receiving antenna 2 is arranged to follow this contour, so as to minimize any coupling with the transmitting antenna assembly.

Figure 2:
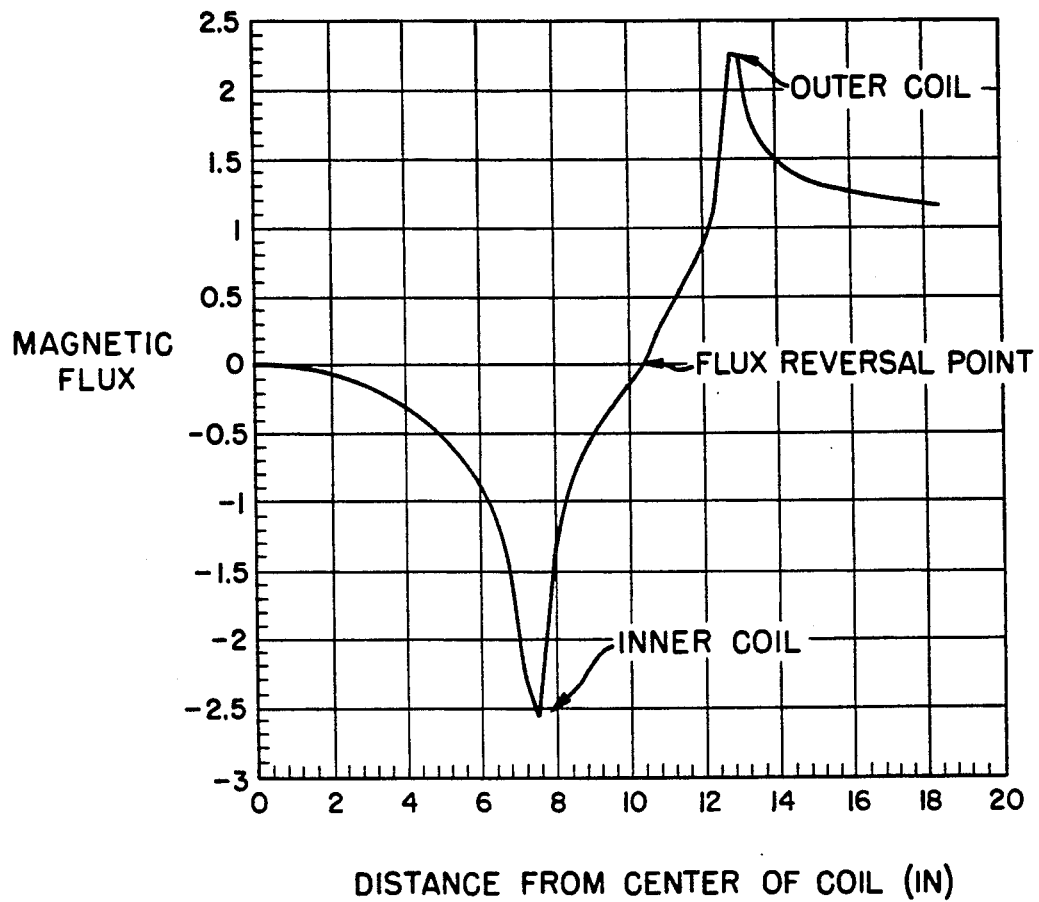
FIG. 2 shows the magnetic flux intensity $\Phi$ in the plane of the antenna arrangement of FIG. 1 as a function of the distance from the center of the arrangement.

The above occurrence of a null contour for the transmitting antenna assembly is further illustrated in FIG. 2 which is a plot of the magnetic flux of a representative assembly in which the inner antenna 3 has a fixed radius a1 of approximately 7.5" and the outer antenna has a fixed radius a2 of about 13.0". As can be seen, the magnetic flux $\Phi$ decreases from a value of zero at the center of the antennas to a negative 2.5 at the circumference of the inner loop, i.e., at a radius r equal to 7.5". At a radius of 10.4", between inner and outer loop circumferences, the magnetic flux $\Phi$ again becomes zero or a null and this radius defines the null contour for the assembly.

The antenna arrangement of the invention has been discussed above in terms of a circular configuration for each of the transmitting antennas 3 and 4 for ease of explanation, only. However, the principles of the invention are intended to apply to transmitting antennas of other configurations, as well. In such cases, the null contour for the transmitting antenna at which the receiving antenna is to be placed can be determined by empirical and/or experimental means. Also, the null contour could be other than coplanar with the transmitting assembly antennas. Additionally, the two transmitting antenna need not be coplanar.

As an example of an antenna arrangement in accordance with the invention, an elliptical configuration has been fabricated. This configuration comprised inner and outer elliptical transmitting antennas. The inner elliptical transmitting antenna had a major axis radius of 9 inches and a minor axis radius of 6 inches, while the outer elliptical transmitting antenna had a major axis radius of 16 inches and a minor radius axis of 11 inches. The outer elliptical transmitting antenna comprised 10 coil turns, while the inner elliptical transmitting antenna comprised 30 coil turns. With this configuration for the outer and inner transmitting antennas, the receiving antenna was also elliptical and comprised 50–100 coil turns. The major and minor axes radii of the receiving elliptical antenna, in turn, were 14 inches and 9 inches, respectively. Furthermore, the receiving antenna was situated in a plane displaced 1.5 inches from the plane of the transmitting antennas.

Figure 3:
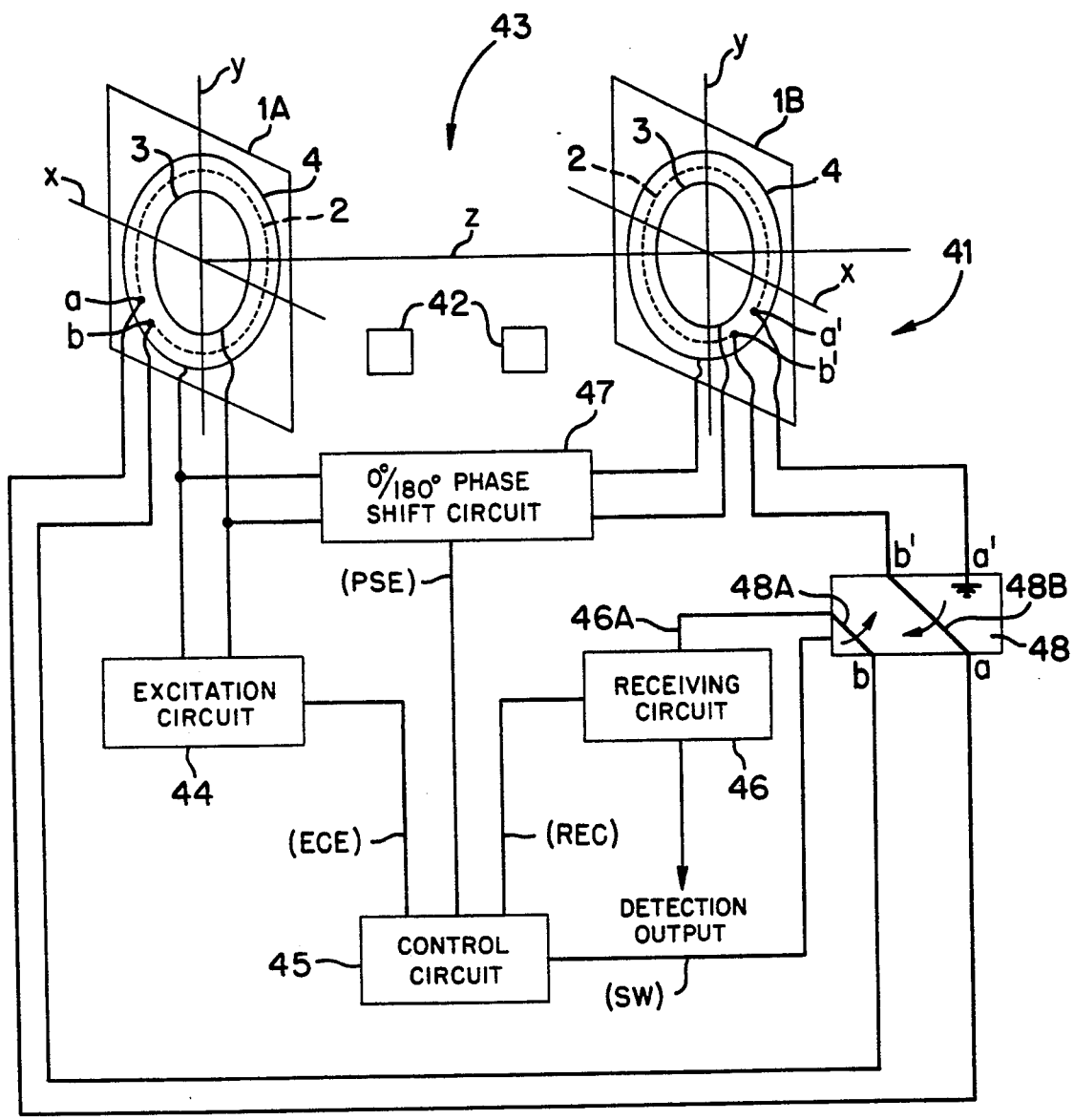
FIG. 3 illustrates an electronic article surveillance system utilizing antenna arrangements as shown in FIG. 1.

FIG. 3 shows an EAS system 41 in which antenna arrangements in accordance with the invention are used to detect the presence of magnetic tags, shown as magnetostrictive tags 42, in a surveillance zone 43. First and second antenna arrangements IA and IB, each similar in construction to the antenna arrangement 1 in FIG. 1, are positioned at opposing edges of the surveillance zone 43. As shown, the antenna arrangements are situated in the x (lateral direction) /y (vertical direction) plane with their axes along the z (horizontal) direction.

An excitation circuit 44 is periodically enabled by a control circuit 45 to excite the transmitting antennas 3 and 4 of the first and second antenna arrangements IA and IB. This excitation causes respective first and second magnetic fields at a fundamental frequency to be transmitted within the surveillance zone 43. A receiving circuit 46 connects to the receiving antennas 2 also situated substantially in the x/y plane of the antenna arrangements and detects the unique signals that are emitted by any magnetostrictive tags 42 located within the zone 43.

As discussed previously with respect to the antenna arrangement 1, the energy of the fundamental magnetic fields formed by the transmitting antennas 3 and 4 is not coupled to the respective receiving antenna 2. Therefore, the receiving circuit 46 can be enabled by the control circuit 45 immediately or nearly immediately after the transmitting antennas are turned off without the receiving circuit 46 being subject to interference from the transmitting antennas. Moreover, since there is very little delay in turning on the receiving antennas, any signals generated by tags within the zone will be close to their maximum values when the receiving antennas turn on. Accordingly, this allows the sensitivity demands placed on the receiving circuit to be lessened and/or the surveillance zone to be made wider. Moreover, this is accomplished with a reduced number of coils and a reduced number of nulls as compared with prior figure-eight type antenna arrangements.

Also, since the system 41 of FIG. 3 can be operated without delay in turning on the receiving antennas, the system 41 can also now be advantageously operated in a dual mode to promote detecting tags 42 regardless of their orientation. Thus, in a first mode, the system 41 is operated such that the transmitting antennas 3 and 4 of the antenna arrangement IB are excited 180° out-of-phase (via 0°/180° phase shift circuit 47) with the transmitting antennas 3 and 4 of the antenna arrangement IA. As a result, the fields generated in the zone 43 by the antenna arrangements oppose along the z direction and add along the x and y directions.

Accordingly, tags oriented in the y direction (vertically) and in the x direction (laterally) in the zone 43 will generate additive voltages in the receiving antennas 2, provided the latter are also connected serially by the switch 48 so as to be out-of-phase, i.e., such that the terminals a, b are connected by the switch 48 to the terminal b' and the receiving circuit input 46A, respectively. As a result, in this mode of operation of the system 41, the detection of tags oriented vertically and laterally in the zone 43 is facilitated.

In a second mode of operation of the system 41, the transmitting antenna arrangement IB is excited so that it is in-phase with the antenna arrangement IA. In such case, the fields generated along the z direction (horizontally) in the zone 43 will be additive. Tags oriented in this direction will thus generate additive voltages in the antennas 2, provided the switch 48 connects the antennas 2 serially in-phase, i.e., with the terminals a, b connected to receiving circuit input 46A and the terminal b'. This second mode of operation thus facilitates detection of tags with horizontal orientation.

As can be appreciated, by switching the antenna arrangement of the system 41 between the above two modes of operation, tags oriented in the vertical, lateral and horizontal directions can now be more readily detected. In the FIG. 3 arrangement, this is accomplished using the control circuit 45 to control the excitation circuit 44, the 0°/180° phase shifter 46, the receiving circuit 45 and the switch 48 to provide the in-phrase and out-of-phase excitation of the transmitting antennas 3 and 4 and the in-phase and out-of-phase connection of the receiving antennas 2.

Figure 4:
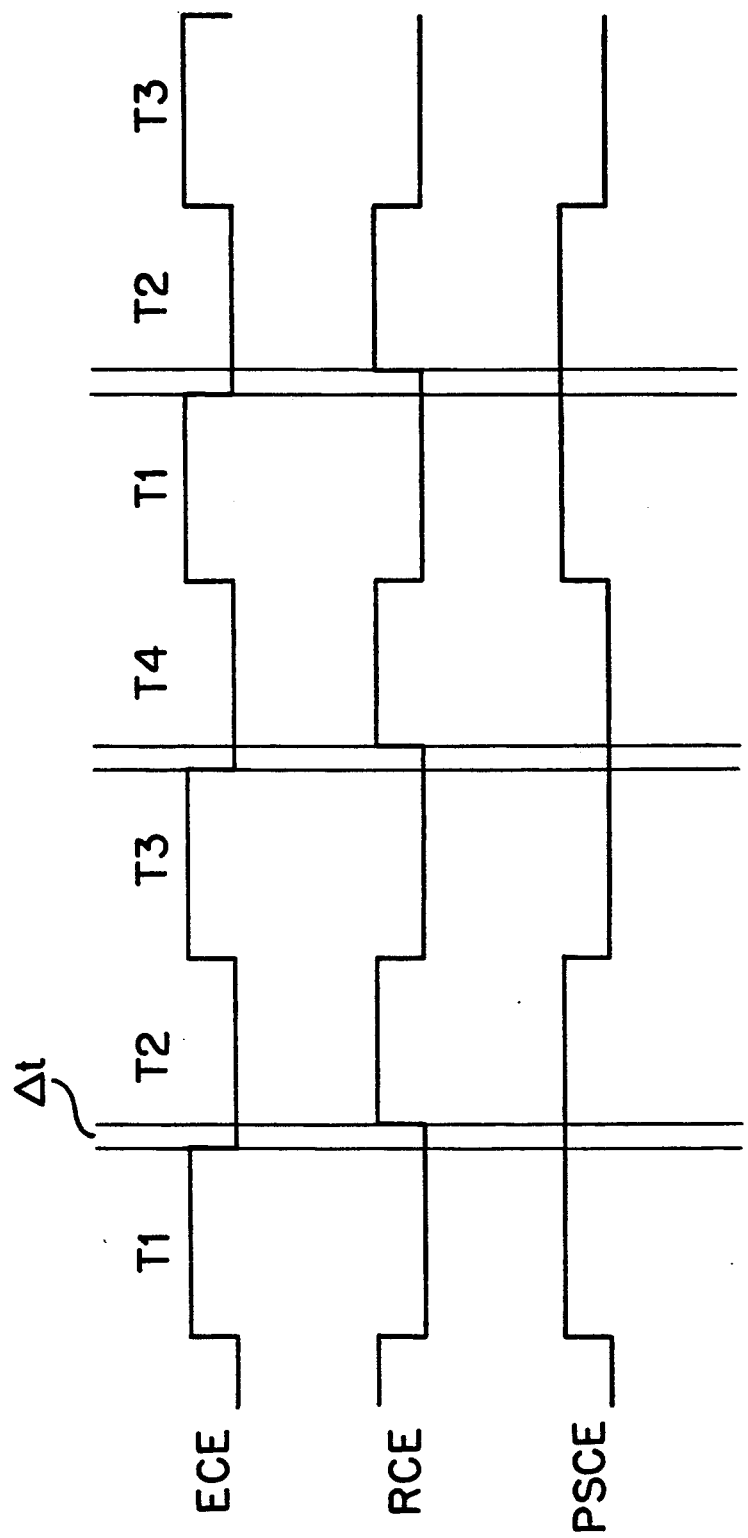
FIG. 4 shows a timing diagram for the control circuit of the electronic article surveillance system of FIG. 3.

Referring now to FIG. 4, the timing of the operation of the system 41 of FIG. 3 is depicted. During a period shown as T1, the excitation circuit enable output (ECE) of the control circuit 45 is turned ON, the receiving circuit enable output (RCE) of the control circuit is OFF and the phase shift circuit enable output (PSCE) of the control circuit is ON. Accordingly, the excitation circuit 44 provides an excitation current to the first antenna array 1A and to the 0°/180° phase shift circuit 47. Since the phase shift circuit 47 is enabled, the output thereof is 180° out-of-phase with the output of the excitation circuit 44 and this phase shifted output drives the second antenna arrangement 1B. Due to the phase difference of the excitation currents, the respective fields formed in the surveillance zone 43 are opposing. During T1 the receiving circuit 46 is disabled to prevent erroneous detections.

At a time period T2, the ECE output is turned OFF thereby disabling the excitation circuit 44. From the time the ECE output is turned OFF, within a short time period t, the RCE output is turned ON thereby enabling the receiving circuit 46. Also, the SW output is turned ON causing the switch elements 48A and 48B to connect the terminal b to the receiving circuit input 46A and the terminal a to the terminal b'. Since, as discussed previously, the coupling of the transmitted fundamental fields into the receiving antennas 2 is minimal, the time period t can be extremely short and in some cases can be set to zero.

As above-described, since the fields formed in the surveillance area 43 during the time period T1 are opposing, the voltage generated from tags 42 in the out-of-phase receiving antennas will be additive when the tags are oriented vertically and laterally. Thus, in this mode of operation detection of vertically and laterally oriented tags is facilitated.

At a time period T3, the ECE output is turned ON, the RCE output is turned OFF, the PSCE output is turned OFF and the switch SW output is turned OFF. Accordingly, the excitation circuit 44 provides an excitation current to the first antenna array 1A and the phase shift circuit 47 provides a like excitation current to the antenna arrangement 1B. Since the phase shift circuit 47 is disabled, the output thereof is at 0° phase-shift with respect to the output of the excitation circuit 44. Due to the excitation currents being in-phase, the respective fields formed in the surveillance zone are additive.

At a time period T4, the ECE output is turned OFF thereby disabling the excitation circuit 44. From the time the ECE output is turned OFF, within a short time period t, the RCE output is turned ON thereby enabling the receiving circuit 46 Since the switch output has turned OFF, the switch elements 48A and 48B now connect the receiving circuit input 46A to the terminal a and the terminal b to the terminal b'. The receiving antenna are thus connected in-phase. Since the fields formed in the surveillance zone 43 in the time period T3 were additive, the voltages generated from tags 42 in the in-phase antennas 2 will be additive when the tags are oriented horizontally. Thus, in this mode of operation, detection of horizontally oriented tags is facilitated.

In all cases it is understood that the above-described arrangements are merely illustrative of the many possible specific embodiments which represent applications of the present invention. Numerous and varied other arrangements can readily be devised in accordance with the principles of the present invention without departing from the spirit and scope of the invention. Thus, for example, instead of using circular or elliptical antennas for the antenna arrangement, rectangular antennas might also be used. Also, the inner antenna and outer antennas of the antenna arrangement of the invention can be designed as provided in the above-mentioned '726 PATENT. In such case, the inner and outer antennas can be excited at a respective excitation ratio of three to one or two to one. Additionally, transmitting antenna arrangements usable with the invention can have an inner antenna which bounds an area of less than about 2.25 square feet and outer antenna which bounds an area of less than about 6.5 square feet.

What is claimed is:

1. An EAS system for use in detecting the presence of an EAS tag in a zone subject to surveillance, said system comprising:

a first antenna arrangement comprising: first and second loop antennas together arranged so that upon simultaneous excitation at a predetermined frequency and in opposite phase by a first means, the magnetic flux from said first and second antenna substantially cancel at a first null contour and on either side of which the magnetic flux from said first and second antennas other than substantially cancel; and a third antenna arranged substantially at said first null contour of said first and second loop antennas;

said first means for simultaneously exciting and which simultaneous excites said first and second loop antennas at said predetermined frequency and in opposite phase; and a receiver connected to said third antenna and an alarm circuit connected to said receiver to provide output indication of the presence of an EAS tag in said surveillance zone.

2. An EAS system as claimed in claim 1 wherein:
said first, second and third antennas have centers on a common axis and circumscribe their respective centers at respective first, second and third different distances from said common axis, said second distance being greater than said first distance and said third distance being less than said second distance and greater than said first distance.

3. An EAS system as claimed in claim 1 further comprising:
a magnetoelastic EAS tag.

4. An EAS system as claimed in claim 1 further comprising:
a magnetic EAS tag.

5. An EAS system as claimed in claim 2 wherein:
said first and second antennas are arranged and configured relative to one another so that the near-fields in the surveillance zone are essentially controlled by the field of said first antenna and the far-fields beyond the surveillance zone are of lesser strength than said near-fields and are determined by the fields of both said first and second antennas.

6. An EAS system as claimed in claim 2 wherein:
said first and second antennas are disposed in a common plane; and
said third antenna is disposed in said common plane.

7. An EAS system as claimed in claim 6 wherein:
the first, second and third antennas are circular.

8. An EAS system as claimed in claim 6 wherein:
the first, second and third antennas are elliptical.

9. An EAS system as claimed in claim 2 wherein:
a first area bounded by said first antenna is less than 2.25 square feet and a second area bounded by said second antenna is less than 6.5 square feet.

10. An EAS system as claimed in claim 1 wherein:
the first and second antennas are electrically conductive coils.

11. An EAS system as claimed in claim 10 wherein:
said electrically conductive coils are comprised of under one hundred individual turns.

12. An EAS system as claimed in claim 1 wherein:
said predetermined frequency is less than 100 kHz.

13. An EAS system as claimed in claim 1 further comprising:
a second antenna arrangement comprising: fourth and fifth loop antennas arranged so that upon simultaneous excitation at said predetermined frequency and in opposite phase by a second means, the magnetic flux from said fourth and fifth loop antennas substantially cancel at a second null contour and on either side of which the magnetic flux from said fourth and fifth loop antennas other than substantially cancel; and a sixth loop antenna arranged substantially at said second null contour of said fourth and fifth loop antennas;
and said second means for simultaneously exciting and which simultaneously excites said fourth and fifth loop antennas at said predetermined frequency and in opposite phase.

14. An EAS system as claimed in claim 13 further comprising:
means for controlling said first and second means so as to selectively excite said first and second antennas and said fourth and fifth antennas in a first mode in which said first and second antennas are in-phase with said fourth and fifth antennas and in a second mode in which said first and second antennas are out-of-phase with said fourth and fifth antennas.

15. An EAS system as claimed in claim 14 further comprising:
means for connecting said third and sixth antennas serially in-phase after said first and second antennas and said fourth and fifth antennas are excited in-phase and for connecting said third and sixth antennas serially out-of-phase after said first and second antennas and said fourth and fifth antennas are excited out-of-phases.

16. An EAS system in accordance with claim 15 further comprising:
means for switching said controlling means to excite said first and second and said fourth and fifth antennas in said first and second modes.

17. An EAS system in accordance with claim 16 wherein:
the first and second antennas are arranged in facing relationship with said fourth and fifth antennas at positions bordering said surveillance zone.

18. An EAS system as claimed in claim 2 wherein:
said first and second antennas are disposed in a common plane; and
said third antennas is disposed in a plane which is parallel to said common plane.

19. An EAS system as claimed in claim 18 wherein:
said first, second and third antennas are circular.

20. An EAS system as claimed in claim 18 wherein:
said first, second and third antennas are elliptical.

21. An EAS system as claimed in claim 18 wherein:
said first, second and third antennas are rectangular.

22. An EAS system as claimed in claim 6 wherein:
said first, second and third antennas are rectangular.

23. An EAS system as claimed in claim 14 further comprising:
means for connecting said third and sixth antennas serially in-phase when said first and second antennas and said fourth and fifth antennas are excited in-phase and for connecting said third and sixth antennas serially out-of-phase when said first and second antennas and said fourth and fifth antennas are excited out-of-phase.

24. A method for use in an EAS system which detects the presence of an EAS tag in a zone subject to surveillance, said method comprising:
arranging at least first and second loop antennas and a third loop antenna bordering said zone;
further arranging said first and second antennas so that upon simultaneous excitation at a predetermined frequency in opposite phase during a step of simultaneously exciting said first and second antennas, the magnetic flux from said first and second antennas substantially cancel at a null contour and on either side of which the magnetic flux from said first and second antennas other than substantially cancel;
further arranging said third antenna substantially at said null contour of said first and second antennas;
simultaneously exciting said first and second antennas at said predetermined frequency and in opposite phase;
connecting a receiver to said third antenna; and
connecting an alarm circuit to said receiver to provide output indication of the presence of an EAS tag in said surveillance zone.

25. A method in accordance with claim 24 further comprising:
situating a magnetic flux EAS tag in said zone.

* * * * *

UNITED STATES PATENT AND TRADEMARK OFFICE
CERTIFICATE OF CORRECTION

PATENT NO. : 5,321,412
DATED : June 14, 1994
INVENTOR(S) : Sensormatic Electronics Corporaiton It is certified that error appears in the above-indentified patent and that said Letters Patent is hereby corrected as shown below:

Column 4, line 40 - change "$\int_S B \cdot nda$" to --$\int_S \bar{B} \cdot \bar{n} da$--

Column 4, lines 55, 58 - change "$a_z$" to --$\hat{a}_z$--

Column 4, line 61 change "wherin" to --where--

Column 5, line 20 after "flux" insert --$\bar{\phi}$--

Column 5, line 23 after "thus," insert --$\bar{\phi}$--

Column 7, lines 53, 60 - change "t," to --$\Delta t$,--

Column 8, line 17 change "t," to --$\Delta t$,--

Column 8, line 18 after "46" insert --.--

Column 8, line 64 change "simultaneous" to --simultaneously--

Signed and Sealed this

Fourth Day of October, 1994

Attest:

BRUCE LEHMAN

Attesting Officer     Commissioner of Patents and Trademarks